US006311378B1

(12) United States Patent
Menguc

(10) Patent No.: US 6,311,378 B1
(45) Date of Patent: Nov. 6, 2001

(54) CRIMP ON FLANGE TOOL FOR DOORSEALS

(75) Inventor: Ismail Menguc, Brighton, MI (US)

(73) Assignee: SaarGummi Americas, Inc., Ann Arbor, MI (US)

( * ) Notice: Subject to any disclaimer, the term of this patent is extended or adjusted under 35 U.S.C. 154(b) by 0 days.

(21) Appl. No.: 09/505,073

(22) Filed: Feb. 16, 2000

(51) Int. Cl.[7] .................................................. B23P 21/00
(52) U.S. Cl. .................................................. 29/235
(58) Field of Search .................................. 451/359, 420; 30/296.1; 29/235

(56) References Cited

U.S. PATENT DOCUMENTS

| 2,954,653 | * | 10/1960 | Harvey ................................ 451/359 |
| 3,974,953 | | 8/1976 | Klose . |
| 4,878,368 | | 11/1989 | Toutant et al. . |
| 4,989,323 | * | 2/1991 | Casper et al. ..................... 30/296.1 |
| 4,996,756 | | 3/1991 | Bright et al. . |
| 5,031,293 | | 7/1991 | Goedderz . |
| 5,048,170 | | 9/1991 | Kuppers . |
| 5,065,486 | | 11/1991 | Goedderz . |
| 5,068,952 | | 12/1991 | Hennen . |
| 5,155,890 | | 10/1992 | Goedderz . |
| 5,169,081 | | 12/1992 | Goedderz . |
| 5,237,730 | | 8/1993 | Goedder . |
| 5,237,741 | | 8/1993 | Goedderz . |
| 5,752,235 | | 5/1998 | Bright . |
| 5,765,276 | | 6/1998 | Pichot . |

OTHER PUBLICATIONS

*The Roll Form System R.F.S.*, Draftex GmbH & Co. KG Am Schluff 18–20, D–41748 Viersen, pp. 1–9.

* cited by examiner

Primary Examiner—Robert C. Watson
(74) Attorney, Agent, or Firm—Young and Basile, P.C.

(57) ABSTRACT

A crimp on flange tool of the type used to crimp door seals to vehicle door frames, comprising a handheld tool connected by a flexible drive coupling to a remote, separate drive unit whose weight is not added to the weight of the handheld tool when used by a human operator. The invention further includes a novel operator handle arrangement for the handheld tool, in which a handle is on-axis with the crimping rollers. Another aspect of the invention is a novel roller arrangement comprising two sets of parallel rollers, with a first set being spaced more widely to function as guide rollers and a second, downstream set being spaced more narrowly to crimp a seal fed to them by the guide rollers.

6 Claims, 5 Drawing Sheets

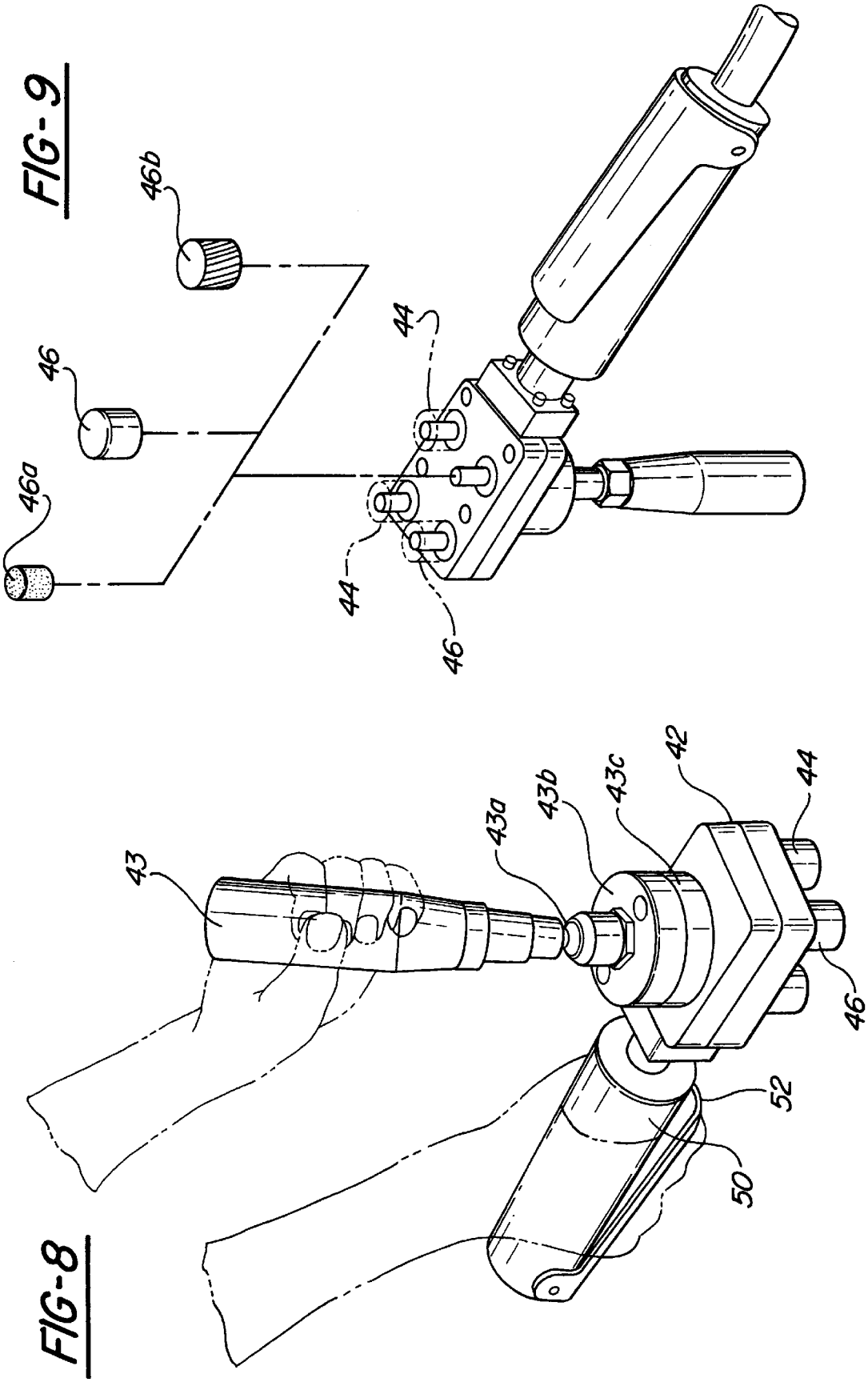

CRIMP ON FLANGE TOOL FOR DOORSEALS

FIELD OF THE INVENTION

The present invention is in the field of "crimp on flange" tools used to crimp or rollform primary door seals around automobile doorframes.

BACKGROUND OF THE INVENTION

Crimp on flange ("COF") tools are handheld devices with a pair of motor or air-driven crimping rollers used to continuously crimp or rollform a generally U-shaped door seal or edge protector to an automobile body flange, usually an automobile door well. Prior art COF tools generally use a pair of pressure rollers to crimp the seal on the flange, sometimes with a third lateral "guide roller" associated with a vertical pair of pressure rollers. Prior art COF tools are awkward to use for several reasons: they are heavy; they are somewhat difficult to initially engage with the seal; and they are not easily adjusted for use on different types of seals or where different driving means (pneumatic, electric) are required.

FIGS. 1 and 2 illustrate a prior art handheld COF tool 20 used for crimping a doorseal 12 on a door well flange 10 in known fashion. Tool 20 generally comprises a roller head 22 having a pair of vertical pressure rollers 24 and a lateral guide roller 26 for engaging and continuously crimping or rollformiing the malleable seal 12 onto flange 10.

Pressure rollers 24 are driven by gearing and spring loading mechanisms (not shown) contained in housing 23, which in turn are driven by an electric or pneumatic motor contained in a motor handle 28. The motor in motor handle 28 is controlled by an operator's lever 30 which, when squeezed, activates the motor to drive pressure rollers 24.

Lateral guide roller 26 is unpowered but freely rotating to maintain downward pressure on the gripping section portion of the flange in known manner.

FIG. 3 illustrates an alternate version 20' of the tool 20 shown in FIGS. 1 and 2. The primary difference between the tool 20' of FIG. 3 and tool 20 of FIG. 2 is the angle of motor handle 28', which in the FIG. 3 embodiment is connected in-line with the gear housing 23' and roller head 22'. Details of the construction and operation of the types of tool shown in FIGS. 1 through 3 can be found in U.S. Pat. No. 5,068,952, for example.

The prior art tool 20' in FIG. 3 is specifically illustrated as having a drive fluid inlet 27 and a drive fluid outlet 28 for supplying a pneumatic motor drive in handle 28'.

SUMMARY OF THE INVENTION

In its broadest form, the present invention is an improved, handheld COF tool in which the motor drive is separated from the handheld tool by a flexible drive coupling, which along with improvements to the roller head and gear drive reduces the total weight of the handheld tool to around one and one half pounds, less than half the weight of even the lightest known prior art tools. The rollers are driven by a novel worm gear drive adapted to receive a flex shaft drive coupling.

Another aspect of the invention is an improved roller arrangement for the tool roller head, in which two pairs of parallel, spaced rollers engage the seal to crimp or rollform it onto a flange. A first pair of rollers functions as guide rollers, being relatively widely spaced so as to easily feed and guide, rather than crimp, the seal. The guide rollers are aligned with a more narrowly spaced set of crimping rollers to accurately guide the crimping rollers over the seal. In one embodiment, one of the guide rollers is a driven roller, and one or more of the remaining rollers is a driven roller. In another embodiment, one or both pairs of rollers are yieldably slide mounted, for example on a pneumatic slide mount, to maintain constant pressure on the seal around a doorframe as the thickness of the doorframe varies. Accordingly, the first embodiment with fixed-mount rollers provides constant roller distance, while the second embodiment with slide-mounted rollers provides constant roller pressure with variable distance.

A further feature of the invention is the use of a worm gear drive which results in a more compact roller head, is easily replaced for gear ratio adjustment, and which allows the use of both pneumatic and electrical drives with a simple drive adapter fitting.

Another feature of the invention is an improved handle arrangement in which a vertical handle coaxial with the roller array is mounted on the back or top of the roller head. The handle is preferably swivel mounted with an anti-pinch feature and has no connection to the drive system. This vertical "joystick" type handle can be the sole handle provided on the roller head, or it can be used in conjunction with the more traditional lateral, drive-type described above in connection with the prior art.

In yet a further form of the invention, the drive and crimp rollers are individually replaceable, such that the roller head can be adapted to different seals merely by replacing one or more of the rollers to adjust the overall spacing between the roller pairs. It has been found that for many applications only the downstream crimping roller needs changing in order to adjust the tool to accommodate different seals, since the more widely spaced guide rollers accommodate the resulting offset caused by the change in spacing between the crimp rollers.

These and other features and advantages of the invention will become apparent upon reading the detailed description of the following drawings.

BRIEF DESCRIPTION OF THE DRAWINGS

FIG. 8 is a close up perspective view of an inventive handle arrangement for a handheld crimping tool according to the invention; and, FIG. 9 is a perspective bottom view of the tool of FIG. 8, incorporating the roller head of FIG. 4 and illustrating in exploded fashion the replaceablility of the rollers.

DETAILED DESCRIPTION OF THE ILLUSTRATED EMBODIMENTS

Figure 4:
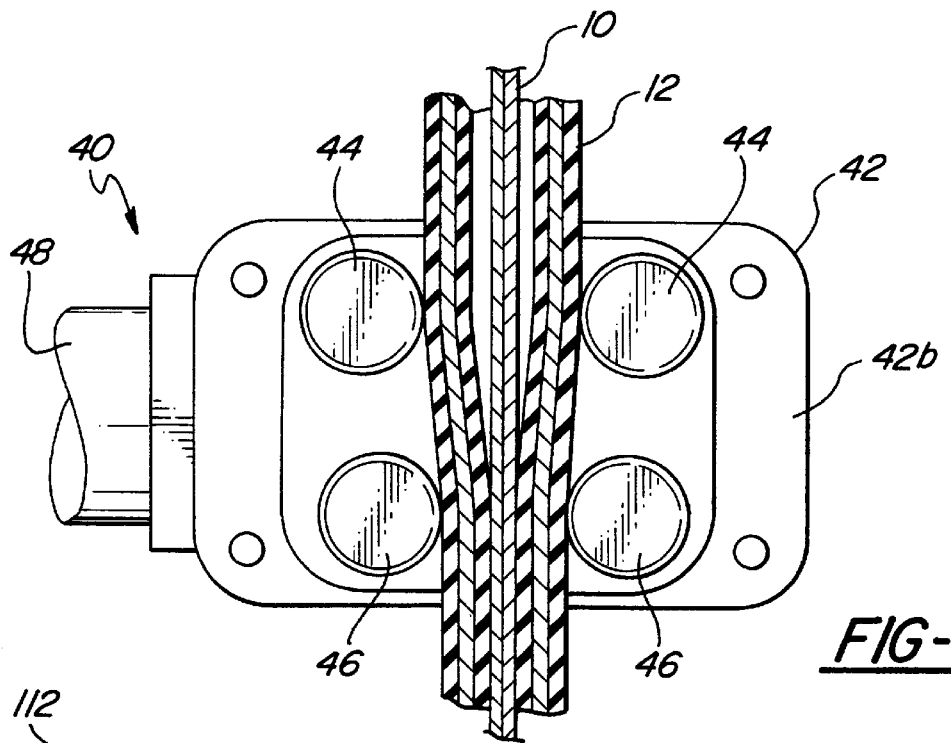
FIG. 4 is an end view of the rollers on a roller head according to the present invention.
Figure 5:
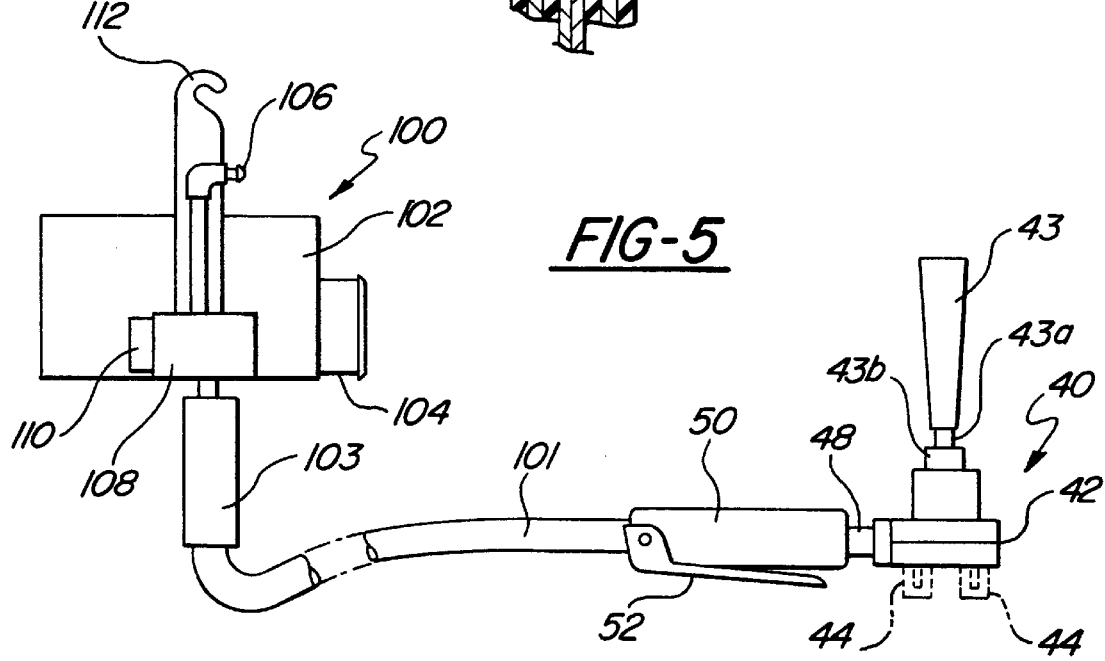
FIG. 5 is a schematic illustration of the broadest aspect of the invention, in which the motor drive and operator-held tool are separated and connected by a flexible drive coupling.

Referring to FIGS. 4 and 5, a handheld COF tool according to the present invention is generally illustrated at 40. Some significant aspects of the invention illustrated in FIGS. 4 and 5 include roller arrangement 44, 46; a novel coaxial handle arrangement; and a flex shaft coupling to a drive motor separated from tool 40.

In FIG. 4, the inventive roller arrangement comprises two sets of parallel rollers 44, 46, in which wide-spaced guide rollers 44 are spaced a distance designed to lightly engage the outer surfaces of seal 12 without crimping the seal onto flange 10, thereby smoothly engaging and guiding seal 12 between the more narrowly spaced crimping rollers 46 which perform the crimping operation. This arrangement facilitates the initial engagement with the seal by the operator, and is believed to make the crimping operation easier and provide a more uniform crimp.

Roller sets 44, 46 are rotatably mounted on roller head 42, with one or more rollers being driven by a drive mechanism entering the roller head through a handle or drive connector 48. The particular drive arrangement of the illustrated embodiment is also believe to constitute an invention, and is illustrated in detail in FIG. 6 below.

It will be understood that the size of rollers 44, 46 will vary depending on the width of seal 12 in the uncrimped and crimped states, respectively. It is accordingly preferred that rollers 44, 46 be removably mounted on roller head 42 so that one or more of the rollers in one or more of the sets can be replaced with a larger-diameter or smaller-diameter roller, or with a roller having a different surface texture, to customize roller head 42 to a particular seal and crimping requirement. The removal and replacement of rollers is described below in more detail with reference to FIGS. 6 and 10.

Referring next to FIG. 5, an inventive drive system and handle arrangement for roller head 42 is illustrated schematically in a preferred arrangement. The primary handle for roller head 42 is a novel, on-axis handle 43 mounted on the "back" or upper side of roller head 42, aligned with the axes of the rollers 44, 46 and generally coaxial with respect to the four-roller array. Handle 43 is preferably mounted in a swivel arrangement, for example with a ball swivel and socket at 43a, 43b, with a limited range of motion to prevent pinching of the operator's hand while negotiating curves during the crimping operation. The vertical, coaxial orientation of handle 43 relative to roller head 42 and rollers 44, 46 has been found to significantly reduce operator fatigue, and to provide much greater control and "feel" for the crimping operation as the operator guides the roller head along the seal around a door frame, for example.

Figure 1:
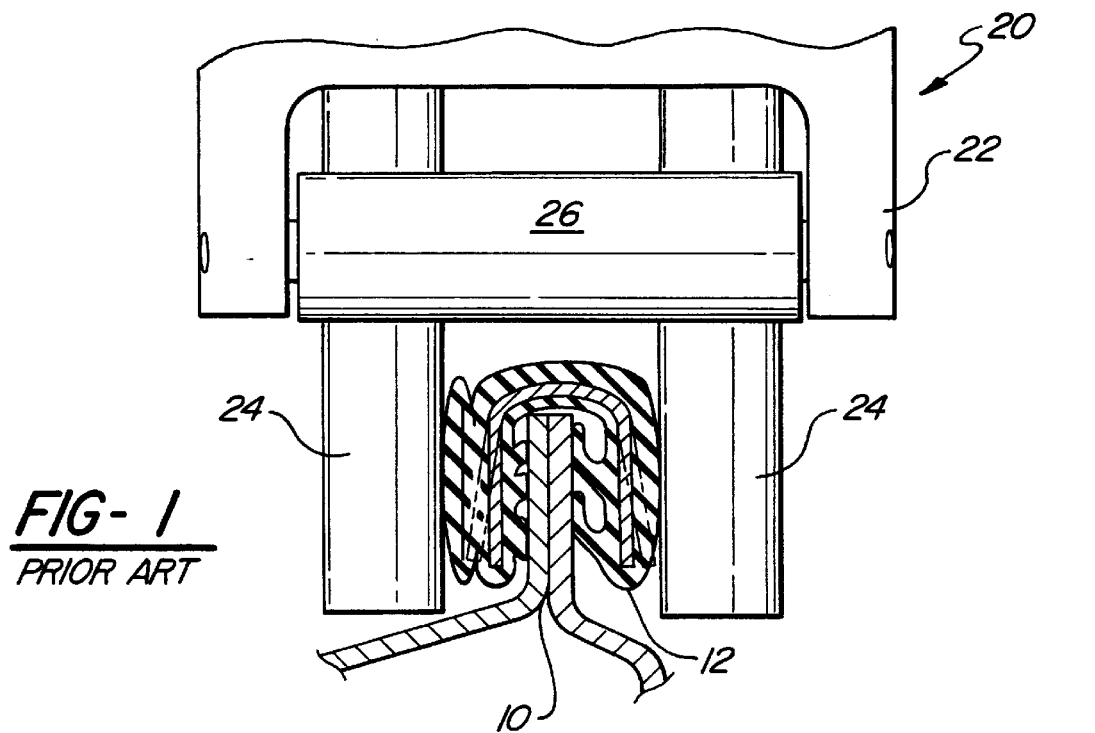
FIG. 1 is an end view of a typical automobile door flange and seal arrangement, in which the seal is being crimped onto the flange by a prior art roller head.
Figure 2:
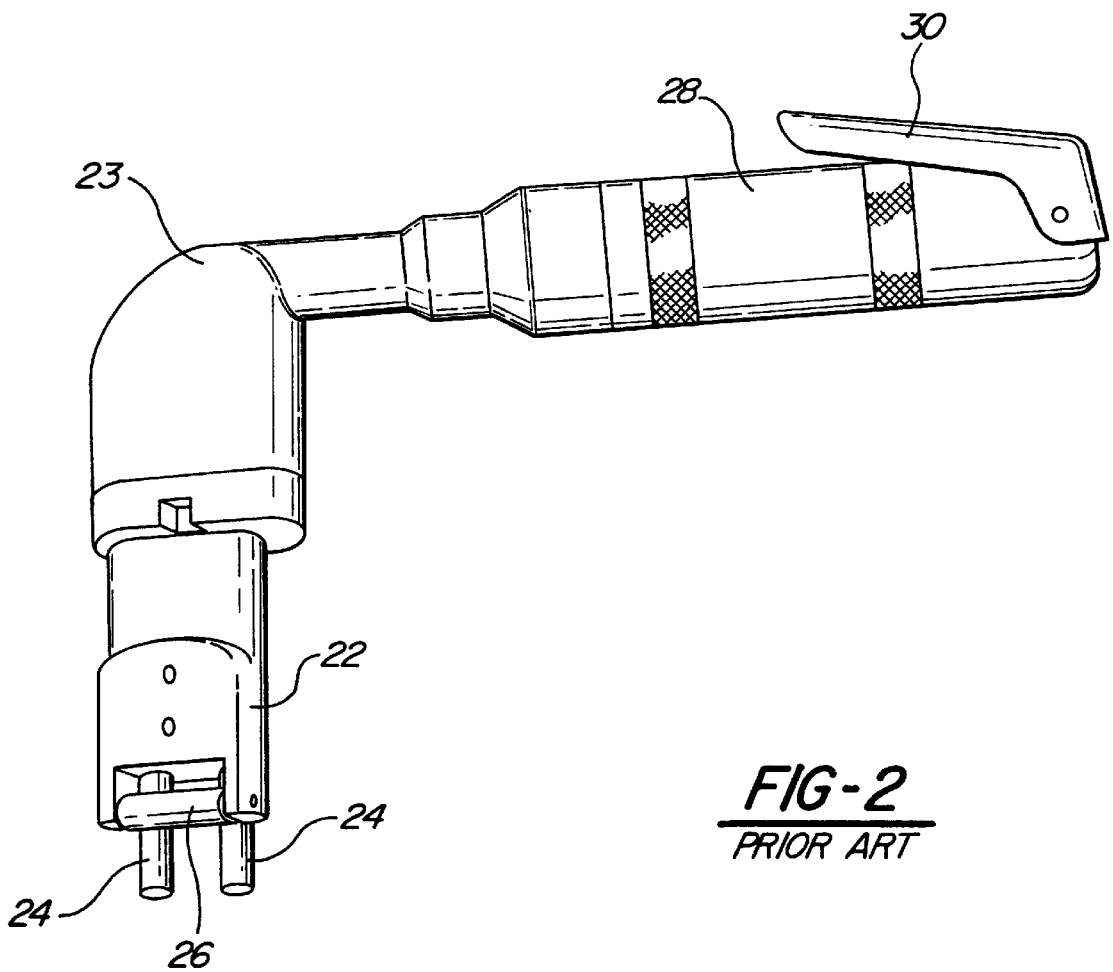
FIG. 2 is a perspective view of a prior art seal-crimping tool, incorporating the roller head of FIG. 1 and having an angled drive handle.
Figure 3:
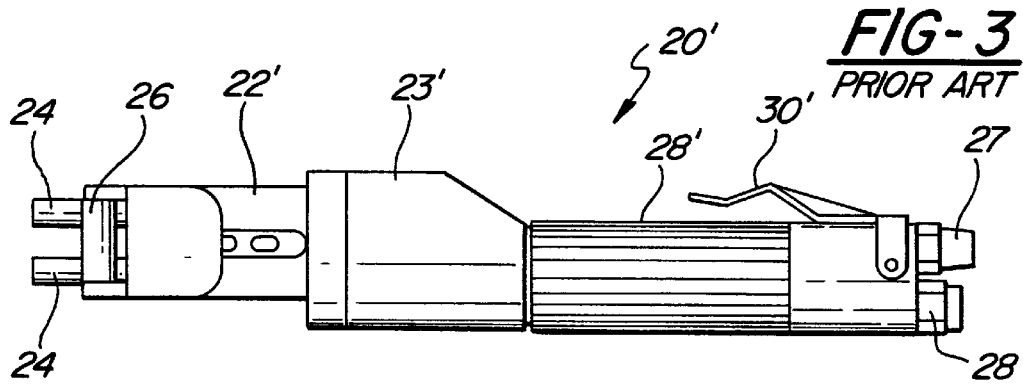
FIG. 3 is a side evational view of a prior art tool similar to the tool of FIG. 2, but with a drive handle aligned with the roller head.

This leaves handle 50 as an optional, lateral, second-hand grip for even greater control, if desired, and as a mounting point for operating trigger 52. In FIG. 5, however, secondary handle/trigger housing 50 does not contain a drive motor as in the prior art of FIGS. 1–3. Instead, in keeping with the present invention, handle 50 and trigger 52 are operatively connected to a flexible drive shaft or flex shaft coupling 101 connecting tool 40 to a separate drive 100 which powers the rollers through coupling 101.

In the preferred, illustrated embodiment, drive 100 comprises a self-contained electrical control box 102 receiving power through a common two- or three-prong receptacle 104 to provide properly-fused/breakered/grounded power to the controls of an air drive motor 103. Air drive motor 103 receives a supply of pressurized air through inlet 106 connected to a suitable air supply with a hose (not shown). The air pressure to motor 103 is regulated by air regulator valving and adjustments 108, 110. The entirety of drive unit 100 is preferably a self-contained, independently-supported unit which can be mounted adjacent the operator work station, for example with a built-in hook 112 for portability. It will be understood by those skilled in the art that drive unit 100 (flex shaft coupling 101, electrical box 102, receptacle 104, air drive motor 103, pressure inlet 106, valving and adjustments 108, 110) is formed from commercially-available components whose purchase and assembly will be within the level of ordinary skill in the art. It will also be understood that other forms of separated drive unit 100 can be used to power tool 40 through a flexible drive coupling, hose, or shaft 101, and that the invention is believed to reside broadly in the separation of the drive 100 from tool 40 and its operative connection thereto through a flexible shaft or coupling such as 101. One possible alternative is to disconnect and move tool 40 from one workstation-mounted drive unit/coupling combination to another.

Figure 6:
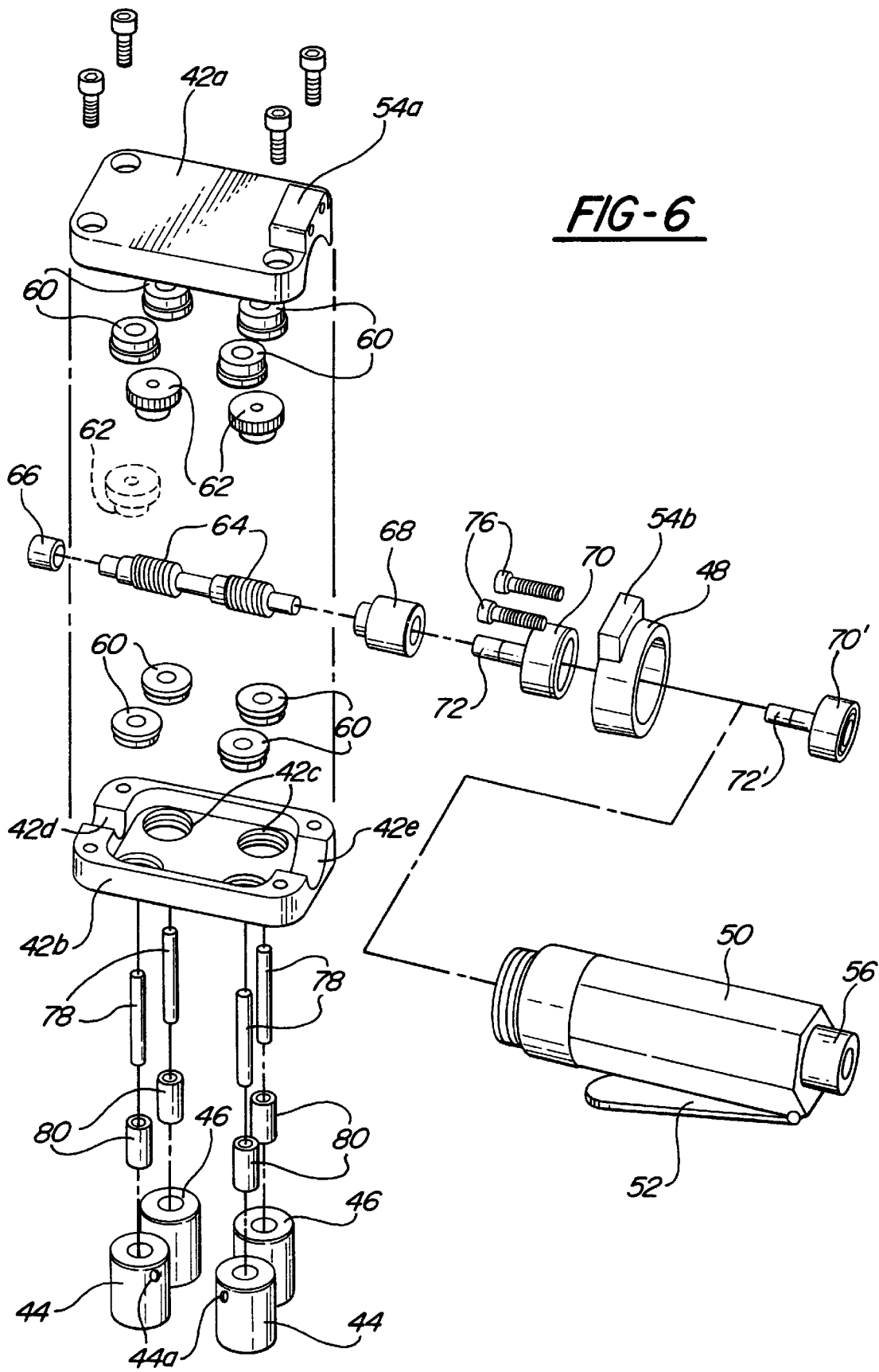
FIG. 6 is an exploded perspective view of the roller head and gear drive of the tool in FIG. 5.

Referring now to FIG. 6, the inventive roller head and roller gearing arrangement according to the invention are shown in an exploded view. Roller head 42 in the illustrated embodiment comprises upper and lower housing portions 42a, 42b fastened together with bolts or screws as shown. Roller head 42 will normally comprise cast or machined metal such as aluminum or steel, although it will be apparent to those skilled in the art that it may be formed from other metals and even other materials such as polymers. Lower housing 42b includes four apertures 42c for receiving bearings 60 therein. Rollers 44, 46 are rotatably mounted on bearings 60 through roller shafts 78 passing through bearings 60 and secured at the opposite end to roller collars 80, which in turn are fastened in suitable bores in rollers 44, 46. The rollers may be fastened to collars 80 by set screws 44a as shown, or the connection between them may be a keyed connection, adhesive, or any other known technique.

An upper set of bearings 60 is similarly housed in upper housing 42a in recesses (not shown) similar to apertures 42c in lower housing 42b.

In the illustrated embodiment, only two of the four rollers 44, 46 are driven rollers, and this is effected by two worm gears 62, each of which is attached to the shaft of one of the guide rollers 44 between the upper and lower sets of bearings 60. Although the illustrated embodiment shows a pair of driven rollers, any combination of one or more of the rollers can be driven by adding appropriate worm gearing 62 and a correspondingly matched worm 64.

Worm gears 62 are driven by worm shaft 64 with two corresponding worm surfaces. The ends of worm 64 are rotatably mounted on bearing surfaces 42d, 42e in the upper and lower housings, preferably with a "dead" end mounted in a bearing 66 nested in surface 42d, and with a "live" end connected to a combination shaft reducer/bearing 68 nested in surface 42e.

Worm 64 is rotatably driven in housing 42 through a gear rod 72, which in turn is rotatably contained in drive connector 48 by a reducer bushing 70 and connected to the flex shaft coupling 101 through handle 50 in a manner known to those skilled in the art of flexible shaft drives.

The present invention's ability to use two powered sets of rollers, one guiding and one crimping, provides improved and easier use of tools. As illustrated in phantom in FIG. 6, only one roller in each set needs to be driven, preferably two adjacent guiding and crimping rollers. It is also possible to drive a diagonally opposite pair of crimping and guide rollers, but such an arrangement requires careful matching of roller diameters or the worm drive and gearing can become complicated.

The worm gear drive in the inventive roller head is robust and easily replaced for gear ratio adjustment. In situations where the separated drive invention of FIG. 5 is undesirable, the worm gear drive further allows the use of both pneumatic and electrical handle-mounted drives because it is not drive-sensitive.

The reducer bushing 70 between the worm gearing and the drive coupling further functions as a drive adapter, allowing the worm gearing in the tool head to be attached to any drive system merely by changing the reducer bushing between the drive system and bushing 70. For example, the connection can be by keyed shaft, by threaded connection, or by other known arrangement, with the appropriate reducer bushing 70, 70' having an interior configuration matched to the particular drive connection.

The laterally-oriented worm gear (perpendicular to the axes of rollers 44, 46) additionally allows the roller head housing to be more compact than prior art roller heads.

Figure 7:
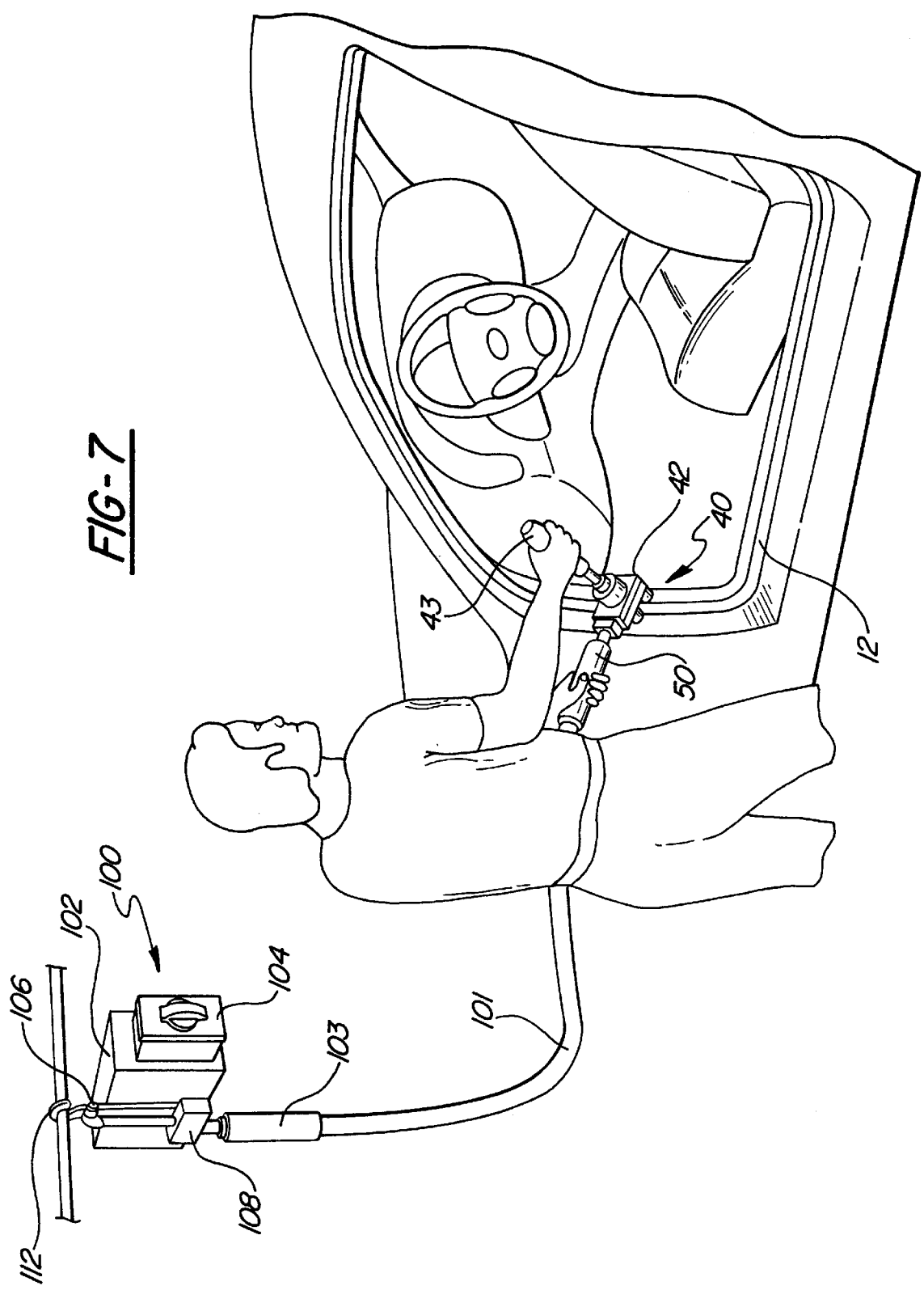
FIG. 7 is a perspective view of an operator using the drive-separated tool of FIG. 5 around an automobile door well.

Referring next to FIG. 7, the invention as illustrated in FIGS. 4–6 is shown in use by a human operator applying a doorseal to an automobile door frame. It will be apparent from FIG. 7 that the unique back-mounted on-axis handle 43 and the optional secondary grip provided by trigger housing 50 provides unparalleled control and ease of use by a human operator around the irregular outline of a doorframe. Furthermore, the weight reduction in tool 40 achieved with the separate drive unit 100 greatly increases a human operator's stamina in using the tool; for example, tools built according to the present invention have been constructed weighing approximately 1.5 pounds, whereas prior art tools with the motor drive built into the tool handle have generally weighed 6 to 7 pounds. The separation of the drive from the hand held tool and handle is the aspect of the invention that will most be appreciated by end users.

Referring now to FIGS. 8 and 9, novel on-axis handle 43 is illustrated in greater detail, in particular showing the swivel mounting of the handle to roller head 42. Swivel connection 43a of handle 43 to roller head 42 is preferred but not necessary to realize the benefits of the on-axis handle arrangement. In FIG. 8 the swivel connection 43a is illustrated as being secured to housing 42 with a screw-down cylindrical metal base 43b secured by screws or bolts to a matching base portion 43c either formed integrally with or added onto the back side of roller head 42.

Referring now to FIG. 9, the replacement of a driven crimping roller 46 with alternate rollers 46a, 46b is illustrated relative to the non-removed rollers to illustrate the ease with which rollers are replaced, and to further illustrate that only a single one of the drive rollers (in particular the downstream, driven, crimping roller 46) need be changed in order to adjust the tool for different seals. The resulting offset between the first and second pairs of rollers has not been found to adversely affect the crimping operation.

A further aspect of the invention is believed to be the use of plastic (polymer) rollers at 44 and 46, for example molded from nylon. Plastic rollers can be replaced with rollers of different size and/or different materials or textures, for example sintered metal as shown at 46a or a grooved plastic roller 46b illustrated in FIG. 9.

It will be apparent to those skilled in the art now that I have disclosed my invention that it can be modified or adapted to different crimping operations without departing from the scope of the invention as claimed below, despite structural differences between such adaptions/modifications and the particular embodiment illustrated above. The spacing and form of the rollers, the number of driven rollers, and the exact nature of the drive 100 and the flexible coupling 101 are particularly susceptible of adaption or modification within the scope of the invention. Accordingly,

I claim:

1. A crimp on flange tool of the type used to crimp door seals around doorframes, comprising:

a hand held tool portion comprising a roller head with parallel crimping rollers mounted on a first side of the roller head parallel to a first axis, a drive member operatively connected to the roller head on a second axis generally perpendicular to the first axis, and a manual operator handle mounted on a second side of the roller head generally parallel to the first axis.

2. The tool of claim 1, wherein the drive member is driven by a drive unit separated from the roller head and connected to the drive member with a flexible drive coupling.

3. The tool of claim 2, wherein the drive member comprises a secondary drive handle protruding laterally from the roller head generally perpendicular to the manual operator handle.

4. The tool of claim 3, wherein the secondary drive handle includes a trigger mechanism for intermittently causing the flexible drive coupling to operate one or more of the rollers.

5. The tool of claim 2, wherein the drive unit comprises an air drive unit with an air-driven motor coupled to the flexible drive coupling.

6. The tool of claim 2, further including a secondary handle protruding laterally from the roller head generally perpendicular to the operator handle.

* * * * *